United States Patent
Zheng

(10) Patent No.: US 12,315,186 B2
(45) Date of Patent: May 27, 2025

(54) POSE DETERMINING METHOD AND APPARATUS, ELECTRONIC DEVICE, AND STORAGE MEDIUM

(71) Applicant: Tencent Technology (Shenzhen) Company Limited, Shenzhen (CN)

(72) Inventor: Yuanli Zheng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 483 days.

(21) Appl. No.: 17/891,996

(22) Filed: Aug. 19, 2022

(65) Prior Publication Data
US 2022/0398767 A1 Dec. 15, 2022

Related U.S. Application Data

(63) Continuation of application No. PCT/CN2021/101028, filed on Jun. 18, 2021.

(30) Foreign Application Priority Data

Aug. 5, 2020 (CN) .................. 202010779847.X

(51) Int. Cl.
*G06T 7/70* (2017.01)
*G06T 19/00* (2011.01)
(Continued)

(52) U.S. Cl.
CPC .............. *G06T 7/70* (2017.01); *G06T 19/006* (2013.01); *G06V 10/25* (2022.01); *G06V 10/761* (2022.01);
(Continued)

(58) Field of Classification Search
CPC ................ G01C 21/365; G06T 19/006; G06T 2207/10016; G06T 2207/10028;
(Continued)

(56) References Cited

U.S. PATENT DOCUMENTS

2019/0244050 A1* 8/2019 Lin .................. G06V 10/17

FOREIGN PATENT DOCUMENTS

CN 104361575 A 2/2015
CN 110057352 A 7/2019
(Continued)

OTHER PUBLICATIONS

Tencent Technology, ISR, PCT/CN2021/101028, Sep. 22, 2021, 2 pgs.
Tencent Technology (Shenzhen) Company Limited, EESR, EP21853854.4, Sep. 7, 2023, 8 pgs.
Mary B. Alatise et al., "Pose Estimation of a Mobile Robot Based on Fusion of IMU Data and Vision Data Using an Extended Kalman Filter", Sensors, vol. 17, No. 10, Sep. 2017, 22 pgs., https://doi.org/10.3390/s17102164.
(Continued)

*Primary Examiner* — Manuchehr Rahmjoo
(74) *Attorney, Agent, or Firm* — Morgan, Lewis & Bockius LLP

(57) ABSTRACT

This application provides a pose determining method performed by an electronic device. The method includes: determining a first two-dimensional plane point in a first video frame captured by a camera, in response to a user-selected point within a display region of a target horizontal plane in a real world captured in the first video frame; obtaining first orientation information of the camera when acquiring the first video frame; determining a first three-dimensional space point corresponding to the first two-dimensional plane point in the real world and first coordinates of the first three-dimensional space point in a camera coordinate system; and determining a pose of the camera when acquiring the first video frame in the world coordinate system, according to the first orientation information of the camera and the first coordinates of the first three-dimensional space point in the real world.

17 Claims, 14 Drawing Sheets

(51) Int. Cl.
*G06V 10/25* (2022.01)
*G06V 10/74* (2022.01)
*G06V 10/771* (2022.01)
*G06V 20/20* (2022.01)

(52) U.S. Cl.
CPC ............ *G06V 10/771* (2022.01); *G06V 20/20* (2022.01); *G06T 2207/10016* (2013.01); *G06T 2207/10028* (2013.01); *G06T 2207/30244* (2013.01); *G06T 2219/008* (2013.01)

(58) Field of Classification Search
CPC . G06T 2207/20101; G06T 2207/30244; G06T 2219/008; G06T 7/246; G06T 7/70; G06T 7/73; G06V 10/25; G06V 10/761; G06V 10/771; G06V 20/20
See application file for complete search history.

(56) References Cited

FOREIGN PATENT DOCUMENTS

| CN | 110599605 A | 12/2019 |
| CN | 111464749 A | 7/2020 |
| CN | 111768454 A | 10/2020 |

OTHER PUBLICATIONS

Tencent Technology, WO, PCT/CN2021/101028, Sep. 18, 2021, 6 pgs.
Tencent Technology, IPRP, PCT/CN2021/101028, Feb. 7, 2023, 7 pgs.

\* cited by examiner

POSE DETERMINING METHOD AND APPARATUS, ELECTRONIC DEVICE, AND STORAGE MEDIUM

CROSS-REFERENCE TO RELATED APPLICATIONS

This application is a continuation application of PCT Patent Application No. PCT/CN2021/101028, entitled "POSE DETERMINATION METHOD AND APPARATUS, AND ELECTRONIC DEVICE AND STORAGE MEDIUM" filed on Jun. 18, 2021, which claims priority to Chinese Patent Application No. 202010779847.X, filed with the State Intellectual Property Office of the People's Republic of China on Aug. 5, 2020, and entitled "POSE DETERMINATION METHOD AND DEVICE, EQUIPMENT AND STORAGE MEDIUM", all of which are incorporated herein by reference in their entirety.

FIELD OF THE TECHNOLOGY

This application relates to the field of simultaneous localization and mapping, in particular to a pose determining method and apparatus, an electronic device, and a storage medium.

BACKGROUND OF THE DISCLOSURE

Augmented reality (AR) is one of hot trending technologies in recent years. A client displays an AR model by superimposing it on a video frame captured by a camera in real time, so as to realizes "enhancement" of a displayed real world. When the client displays the AR model, a pose of the camera in a world coordinate system needs to be determined.

At present, the client generally determines the pose of the camera using an ARkit development component provided by an iPhone operating system (iOS). The ARkit development component is based on a visual inertial odometry (VIO) technology, which can track a position and an attitude of the camera in the real world, and perform matching with a pixel point in the video frame acquired by the camera, thereby determining the pose of the camera in the world coordinate system.

In a case that the client determines the pose of the camera in the world coordinate system using the ARkit development component, due to limitations of the implementation principle, it is necessary to move the camera for system initialization, so as to realize the determining of the pose of the camera. The process of determining the pose is cumbersome and has poor timeliness.

SUMMARY

Embodiments of this application provide a pose determining method and apparatus, an electronic device, and a storage medium, which can simplify the process of determining the pose, thereby improving the timeliness of determining the pose. The technical solutions are as follows:

According to an aspect of the embodiments of this application, there is provided with a pose determining method, the method being performed by an electronic device and including:

determining a first two-dimensional plane point in a first video frame captured by the camera, the first two-dimensional plane point being a user-selected point within a display region of a target horizontal plane, and the target horizontal plane being imaging content of a horizontal plane in a real world captured in the first video frame;

obtaining first orientation information of the camera when acquiring the first video frame;

determining first coordinates of a first three-dimensional space point in a camera coordinate system of the camera, the first three-dimensional space point corresponding to the first two-dimensional plane point in the real world, and the first three-dimensional space point being an origin of a world coordinate system that is independent of the camera coordinate system; and determining a pose of the camera when acquiring the first video frame in the world coordinate system, according to the first orientation information of the camera and the first coordinates of the first three-dimensional space point in the real world.

According to another aspect of the embodiments of this application, there is provided with a pose determining apparatus, including:

a first determining module, configured to determine a first two-dimensional plane point in a first video frame captured by the camera, the first two-dimensional plane point being a user-selected point within a display region of a target horizontal plane, and the target horizontal plane being imaging content of a horizontal plane in a real world captured in the first video frame;

an obtaining module, configured to obtain first orientation information of a camera when acquiring the first video frame;

a second determining module, configured to determine first coordinates of a first three-dimensional space point in a camera coordinate system of the camera, the first three-dimensional space point corresponding to the first two-dimensional plane point in the real world, and the first three-dimensional space point being an origin of a world coordinate system that is independent of the camera coordinate system; and a third determining module, configured to determine a pose of the camera when acquiring the first video frame in the world coordinate system, according to the first orientation information of the camera and the first coordinates of the first three-dimensional space point in the real world.

According to another aspect of this embodiments of this application, an electronic device is provided, including a processor and a memory, the memory storing at least one instruction, at least one program, a code set or an instruction set, and the at least one instruction, the at least one program, the code set or the instruction set being loaded and executed by the processor to implement the pose determining method as described above.

According to still another aspect of this embodiment of this application, a non-transitory computer-readable storage medium is provided, storing at least one instruction, at least one program, a code set, or an instruction set, the at least one instruction, the at least one program, the code set, or the instruction set being loaded and executed by a processor to implement the pose determining method as described above.

According to still yet another aspect of this embodiment of this application, a computer program product or a computer program is provided, the computer program product or the computer program including computer instructions, the computer instructions being stored in a computer-readable storage medium. A processor of an electronic device reads the computer instruction from the computer-readable storage medium, and the processor executes the computer instruction, to cause the electronic device to perform the pose determining method according to any of the optional implementations in the above aspect.

The beneficial effects of the technical solutions provided by this application at least include:

The pose of the camera in the world coordinate system can be determined, according to the first orientation information of the camera when acquiring the first video frame and the first coordinates of the first three-dimensional space point in the camera coordinate system, the first three-dimensional space point corresponding to the first two-dimensional plane point in the first video frame in the real world. During the process of determining the pose, there is no need to move the electronic device for system initialization, which simplifies the process of determining the pose, thereby improving the timeliness of determining the pose.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show only some embodiments of this application, and a person of ordinary skill in the art may still derive other accompanying drawings from these accompanying drawings without creative efforts.

Figure 1:
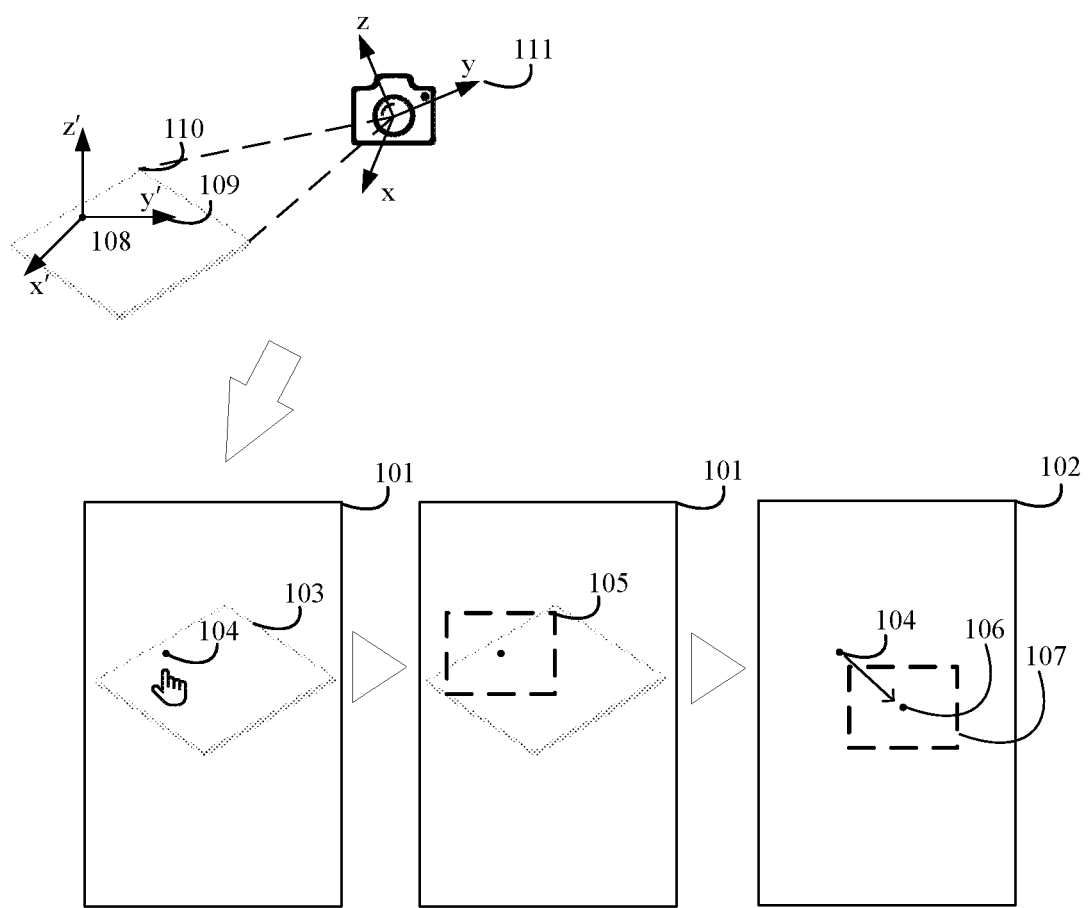
FIG. 1 is a schematic diagram of a principle of determining a pose according to an embodiment of this application.

Accompanying drawings herein are incorporated into a specification and constitute a part of this specification, show embodiments that conform to this application, and are used for describing a principle of this application together with this specification.

DESCRIPTION OF EMBODIMENTS

To make the objectives, technical solutions, and advantages of this application clearer, the following further describes implementations of this application in detail with reference to the accompanying drawings.

To facilitate the understanding of the method according to the embodiments of this application, the terms involved in the embodiments of this application are introduced below:

Image coordinate system: An image coordinate system is a coordinate system with an upper left vertex of an image acquired by a camera as a coordinate origin. An x-axis and a Y-axis of the image coordinate system are length and width directions of the acquired image.

Camera coordinate system: A camera coordinate system is a three-dimensional rectangular coordinate system with a focus center of a camera as an origin and an optical axis as a z-axis. An x-axis of the camera coordinate system is parallel to an x-axis of an image coordinate system of an acquired image, and a y-axis of the camera coordinate system is parallel to a y-axis of the image coordinate system of the acquired image.

World coordinate system: A world coordinate system can describe a position of a camera in the real world, and can also describe a position of an object in an image acquired by the camera in the real world. The camera coordinate system can be converted to the world coordinate system by a pose of the camera in the world coordinate system. Generally, an x-axis of the world coordinate system horizontally points due east, a y-axis of the world coordinate system horizontally points due north, and a z-axis of the world coordinate system is vertically upward.

Pose: A pose is used for describing a position and an attitude of a camera. The position may be represented by coordinates of the camera in the world coordinate system. The attitude refers to an orientation of the camera in the world coordinate system, which may be represented by a rotation matrix.

Inertial measurement unit (IMU): An IMU is an apparatus used to measure a three-axis attitude angle (or an angular speed) and an acceleration of an object. The IMU generally includes three single-axis accelerometers and three single-axis gyroscopes. The accelerometers are used to detect the object's acceleration signals of independent three axes of a carrier coordinate system, and the gyroscopes are used to detect angular velocity signals of a carrier relative to a navigation coordinate system. The IMU can measure the angular velocity and the acceleration of the object in the three-dimensional space, so as to determine the attitude of the object.

EasyAR: An EasyAR is an AR engine that has been widely used. A planar image tracking function provided by the EasyAR can track an established real-world plane image in an image that needs to undergo plane recognition.

In the related art, the client generally determines a pose of a camera using the ARkit development component provided by the iOS. The ARkit development component is based on the VIO technology, which can track a position and an attitude of the camera in the real world, and perform matching with a pixel point in the video frame acquired by the camera, thereby determining the pose of the camera in the world coordinate system.

When implementing the embodiments of this application, the applicant has found the following technical problems in the related art: 1) In a case that the client determines the pose of the camera in the world coordinate system using the ARkit development component, due to limitations of the implementation principle, it is necessary to move the camera for system initialization so as to realize the determining of the pose of the camera, therefore the process of determining the pose is cumbersome and has poor timeliness; 2) The ARkit development component on the iOS system requires for a high-precision inertial sensor, which is supported by only a very small number of electronic devices; 3) The ARkit development component needs to reconstruct a point cloud of thousands of surrounding points before positioning, which requires for high computing performance, therefore a frame rate running on an electronic device with poor computing performance is relatively low; and 4) The ARkit development component only has a positioning function, and an AR model is static which fails to interact with a user, so that a hand recognition function needs to be additionally provided for realizing interaction, thereby making the system more complex.

In view of the above technical problems, an embodiment of this application provides a pose determining method. In the pose determining process, there is no need to move the electronic device for system initialization, which improves the timeliness of the pose determining. FIG. 1 is a schematic diagram of a principle of determining a pose according to an embodiment of this application. As shown in FIG. 1, the AR client obtains a first two-dimensional plane point 104 in a display region of a target horizontal plane 103 in a first video frame 101 acquired by an electronic device which is installed with the AR client. The first two-dimensional plane point 104 is determined according to a touch position of a user's touch operation. The electronic device is integrated with a camera. The target horizontal plane is imaging content of a real-world horizontal plane in the first video frame. The target horizontal plane 103 is recognized by the AR client in the first video frame 101.

As shown in FIG. 1, the AR client establishes a first tracking box 105 with the first two-dimensional plane point 104 as a center. A geometric parameter of the first tracking box 105 is a first geometric parameter. Then, the AR client determines first orientation information of the camera when acquiring the first video frame via an IMU on the electronic device. Description information of the real-world horizontal plane 110 corresponding to the target horizontal plane 103 in the camera coordinate system 111 of the camera is determined according to the first orientation information. According to the description information, a two-dimensional position of the first two-dimensional plane point 104 in the first video frame 101, a distance (usually set to 1 m) from the camera to the target horizontal plane and a camera intrinsic parameter of the camera, the AR client can determine a first depth for reflecting a distance between the first three-dimensional space point 108 in the camera coordinate system 111 and the camera. The first three-dimensional space point 108 is a corresponding point of the first two-dimensional plane point 104 in the real world. The AR client determines first coordinates of the first three-dimensional space point 108 in the camera coordinate system 111 of the camera, according to the first depth, the camera intrinsic parameter and a two-dimensional position of the first two-dimensional plane point 104 in the first video frame 101. Then, the AR client determines a pose of the camera in the world coordinate system 109, according to the first orientation information of the camera when acquiring the first video frame 101 and the first coordinates of the first three-dimensional space point 108 in the camera coordinate system 111 of the camera. The origin of the world coordinate system 109 is the first three-dimensional space point 108. The AR client can display an AR model at the first two-dimensional plane point 104 in the first video frame 101 according to the pose.

As shown in FIG. 1, when displaying a second video frame 102, according to the first tracking box 105, the AR client tracks, in the second video frame 102, a target region where region content corresponding to the first tracking box 105 in the first video frame 101 is located in the second video frame 102, and determines an outer frame of the target region as a second tracking box 107. A geometric parameter of the second tracking box is a second geometric parameter. A center of the second tracking box 107 is determined as a second two-dimensional plane point 106. The second video frame is a subsequent video frame of the first video frame. The AR client can determine a second depth of a second three-dimensional space point corresponding to the second two-dimensional plane point in the real world, according to a ratio of the first geometric parameter to the second geometric parameter and the first depth. Through the above steps, the AR client can continue displaying an AR model in the second video frame 102, according to the second two-dimensional plane point 106 and the second depth.

According to the attitude of the camera when acquiring the first video frame and the first coordinates of the first three-dimensional space point in the camera coordinate system, the first three-dimensional space point corresponding to the first two-dimensional plane point in the first video frame in the real world, the pose of the camera corresponding to the first video frame in the world coordinate system can be determined, so as to display the AR model in the first video frame according to the pose. By the first tracking box, the second two-dimensional plane point corresponding to the first two-dimensional plane point is determined in the second video frame subsequent to the first video frame, and the second depth of the second three-dimensional space point corresponding to the second two-dimensional plane point in the real world is determined. A pose of the camera corresponding to the second video frame in the world coordinate system can also be determined, according to the second two-dimensional plane point and the second depth. During the process of determining the pose of the camera, there is no need to move the electronic device for system initialization, which simplifies the process of determining the pose, thereby improving the timeliness of determining the pose.

The following describes an exemplary application of the electronic device according to an embodiment of this application. The electronic device according to this embodiment of this application may be implemented as various types of user terminals, such as a notebook computer, a tablet computer, a desktop computer, a set-top boxes, a mobile device (e.g., a mobile phone, a portable music player, a personal digital assistant, a special message device, a portable game device), etc. An exemplary application in which the electronic device is implemented as the terminal is described below.

Figure 13:
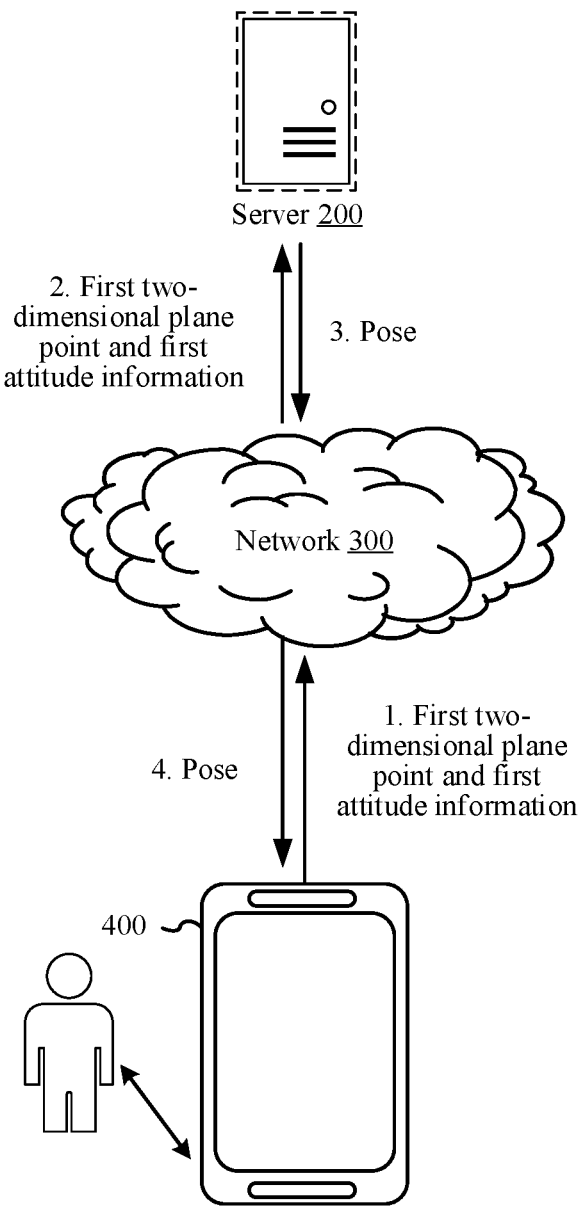
FIG. 13 is a schematic structural diagram of a pose determining system according to an embodiment of this application.

Referring to FIG. 13, it is a schematic structural diagram of a pose determining system according to an embodiment of this application. A terminal 400 is connected to a server 200 through a network 300. The network 300 may be a wide area network, a local area network, or a combination of the two.

The terminal 400 displays a first video frame. In response to a camera initialization operation for the terminal 400, such as, an operation of a user clicking on a terminal screen, the terminal determines a pose of the camera corresponding to the first video frame in the world coordinate system based on a pixel position (the first two-dimensional plane point) of the camera initialization operation and a rotation attitude (the first orientation information) of the camera; and alternatively, the terminal 400 transmits the pixel position (the first two-dimensional plane point) of the camera initialization operation and the rotation attitude (the first orientation information) of the camera to the server 200, and the server 200 determines the pose of the camera corresponding to the first video frame in the world coordinate system based on the pixel position (the first two-dimensional plane point) of the camera initialization operation and the rotation attitude (the first orientation information) of the camera.

In some embodiments, the server 200 may be an independent physical server, may also be a server cluster or distributed system composed of a plurality of physical servers, and may also be a cloud server providing basic cloud computing services, such as a cloud service, a cloud database, cloud computing, a cloud function, cloud storage, a network service, cloud communication, a middleware service, a domain name service, a security service, a CDN, and a large data and AI platform. The terminal 400 may be a smartphone, a tablet computer, a notebook computer, a desktop computer, a smart speaker, a smart watch, or the like, but is not limited thereto. The terminal and the server may be directly or indirectly connected in a wired or wireless communication manner. This is not limited in the embodiments of this application.

Figure 2:
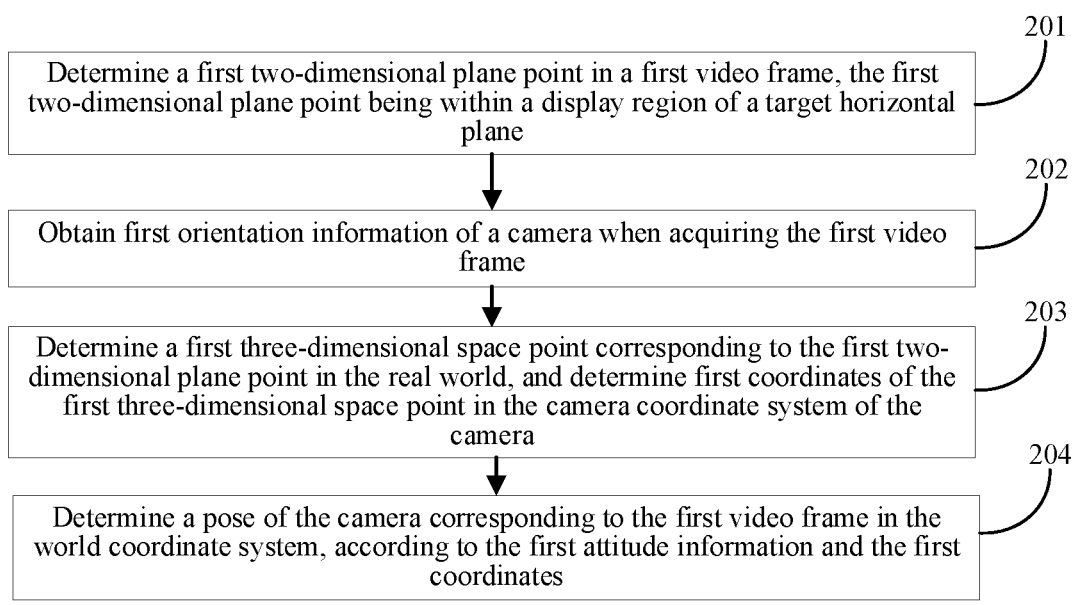
FIG. 2 is a schematic flowchart of a pose determining method according to an embodiment of this application.

FIG. 2 is a schematic flowchart of a pose determining method according to an embodiment of this application. The method may be applied to an electronic device or an AR client on an electronic device having a built-in camera. As shown in FIG. 2, the method includes:

Step 201. Determine a first two-dimensional plane point in a first video frame captured by the camera, the first two-dimensional plane point being a user-selected point within a display region of a target horizontal plane.

As an example, the first video frame is any video frame in a video acquired by the electronic device installed with the AR client. The electronic device is integrated with a camera. For example, the electronic device is a mobile phone integrated with a camera and a camera with computing power.

The target horizontal plane is imaging content of a real-world horizontal plane in the first video frame. The real-world horizontal plane is a horizontal plane of a three-dimensional space of the real world. The target horizontal plane is recognized by the AR client in the first video frame. The AR client recognizes the target horizontal plane in the first video frame using a graph-based planar object tracker (Gracker) algorithm. Through the Gracker, the AR client can match an image that needs to undergo plane recognition with a known real-world plane image, so as to recognize the target horizontal plane. During the process of image matching, the Gracker can perform matching on features of the image, and at the same time estimate a corresponding attitude corresponding to the image to improve matching accuracy, thereby effectively enhancing accuracy of recognizing the target plane. For example, a desktop or a ground is recognized in the first video frame.

In an example, the first two-dimensional plane point is used for displaying an AR model in the first video frame. The AR client determines the first two-dimensional plane point according to a touch position of a touch operation for the first video frame.

Step 202. Obtain first orientation information of a camera when acquiring the first video frame.

As an example, the first orientation information is used for reflecting a change in a current attitude of the camera relative to an attitude when horizontally northward. Exemplarily, the electronic device is a mobile phone, and the camera is a camera on the mobile phone. The mobile phone is placed horizontally with a screen facing up. The camera is horizontally northward in a case that a direction of a connection line between a charging port and a handset of the mobile phone is horizontally northward.

As an example, the AR client obtains the first orientation information of the camera when acquiring the first video frame via an IMU on the electronic device.

Step 203. Determine a first three-dimensional space point corresponding to the first two-dimensional plane point in the real world, and determine first coordinates of the first three-dimensional space point in the camera coordinate system of the camera.

The first coordinates are used for determining a position in the pose of the camera in the world coordinate system. The AR client determines the first coordinates, according to the first orientation information, a two-dimensional position of the first two-dimensional plane point in the first video frame, a distance from the camera to the target horizontal plane, and a camera parameter of the camera, such as a camera intrinsic parameter.

Step 204. Determine a pose of the camera when capturing the first video frame in the world coordinate system, according to the first orientation information of the camera and the first coordinates of the first three-dimensional space point in the real world.

The origin of the world coordinate system is the first three-dimensional space point. According to the first orientation information of the camera and the first coordinates of the first three-dimensional space point, the AR client can determine coordinates of the camera in the world coordinate system, so as to determine the position in the pose of the camera in the world coordinate system. In the above processes, the process of determining the pose does not require the electronic device to provide a high-precision inertial sensor, which effectively saves resources of the device, and does not require reconstructing a point cloud of thousands of surrounding points before positioning, which enables a high frame rate to run on an electronic device with low computing performance.

According to the first orientation information and the first three-dimensional space point, an attitude in the pose of the camera in the world coordinate system can be determined, so as to determine the pose of the camera in the world coordinate system.

In summary, according to the first orientation information of the camera when acquiring the first video frame and the first coordinates of the first three-dimensional space point in the camera coordinate system, the first three-dimensional space point corresponding to the first two-dimensional plane point in the first video frame in the real world, the pose determining method provided by this embodiment of this application can determine the pose of the camera in the world coordinate system, so as to display the AR model in the first video frame according to the pose. During the process of determining the pose, there is no need to move the electronic device for system initialization, which simplifies the process of determining the pose, thereby improving the timeliness of determining the pose.

Figure 3:
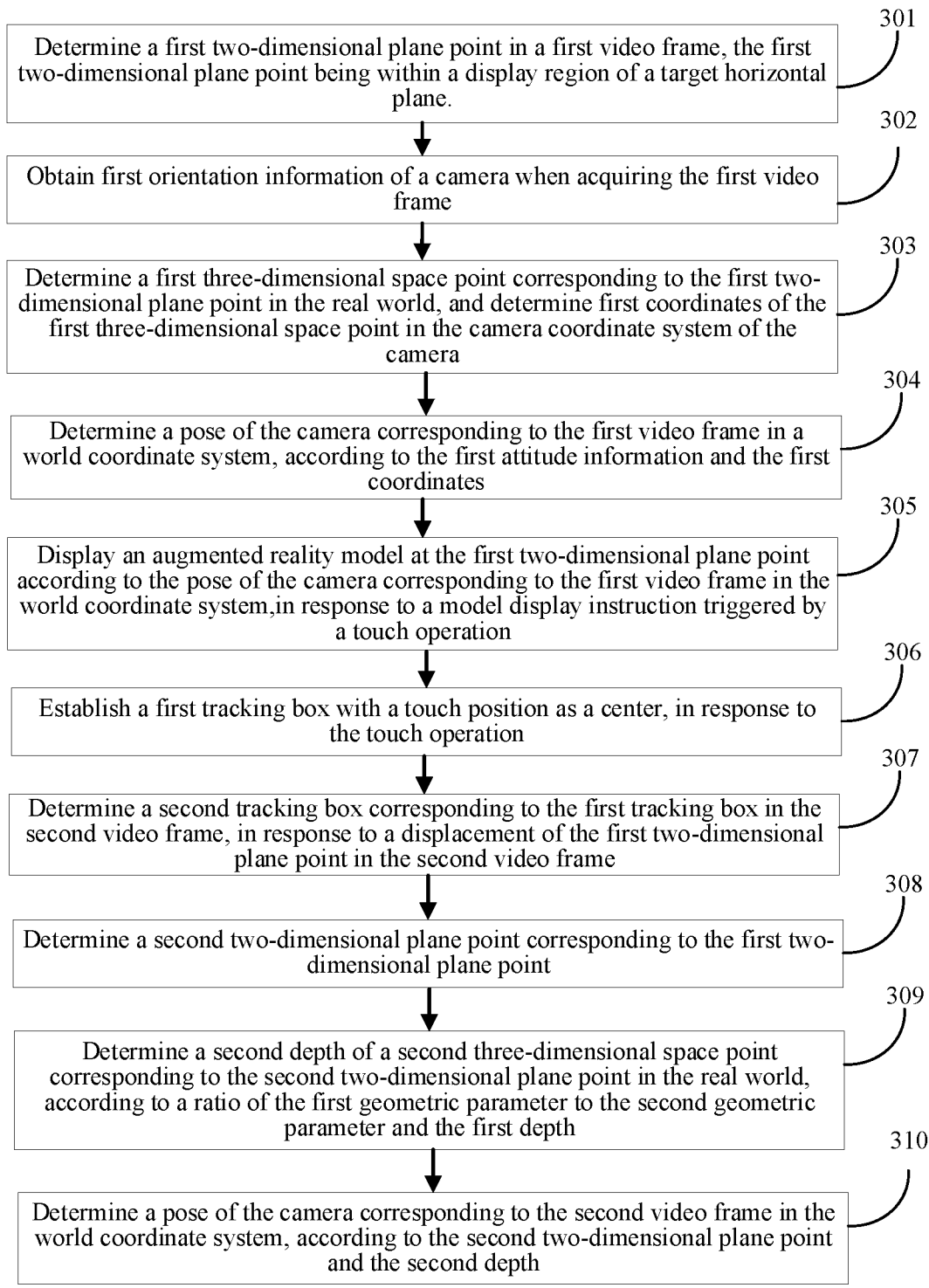
FIG. 3 is a schematic flowchart of another pose determining method according to an embodiment of this application.

FIG. 3 is a schematic flowchart of another pose determining method according to an embodiment of this application. The method may be applied to an electronic device or an AR client on an electronic device. As shown in FIG. 3, the method includes:

Step 301. Determine a first two-dimensional plane point in a first video frame, the first two-dimensional plane point being within a display region of a target horizontal plane.

The target horizontal plane is imaging content of a real-world horizontal plane in the first video frame. The first two-dimensional plane point is on the target horizontal plane in the first video frame, that is, a pixel point where the first two-dimensional plane point is located is within pixel points included in the target horizontal plane.

Figure 4:
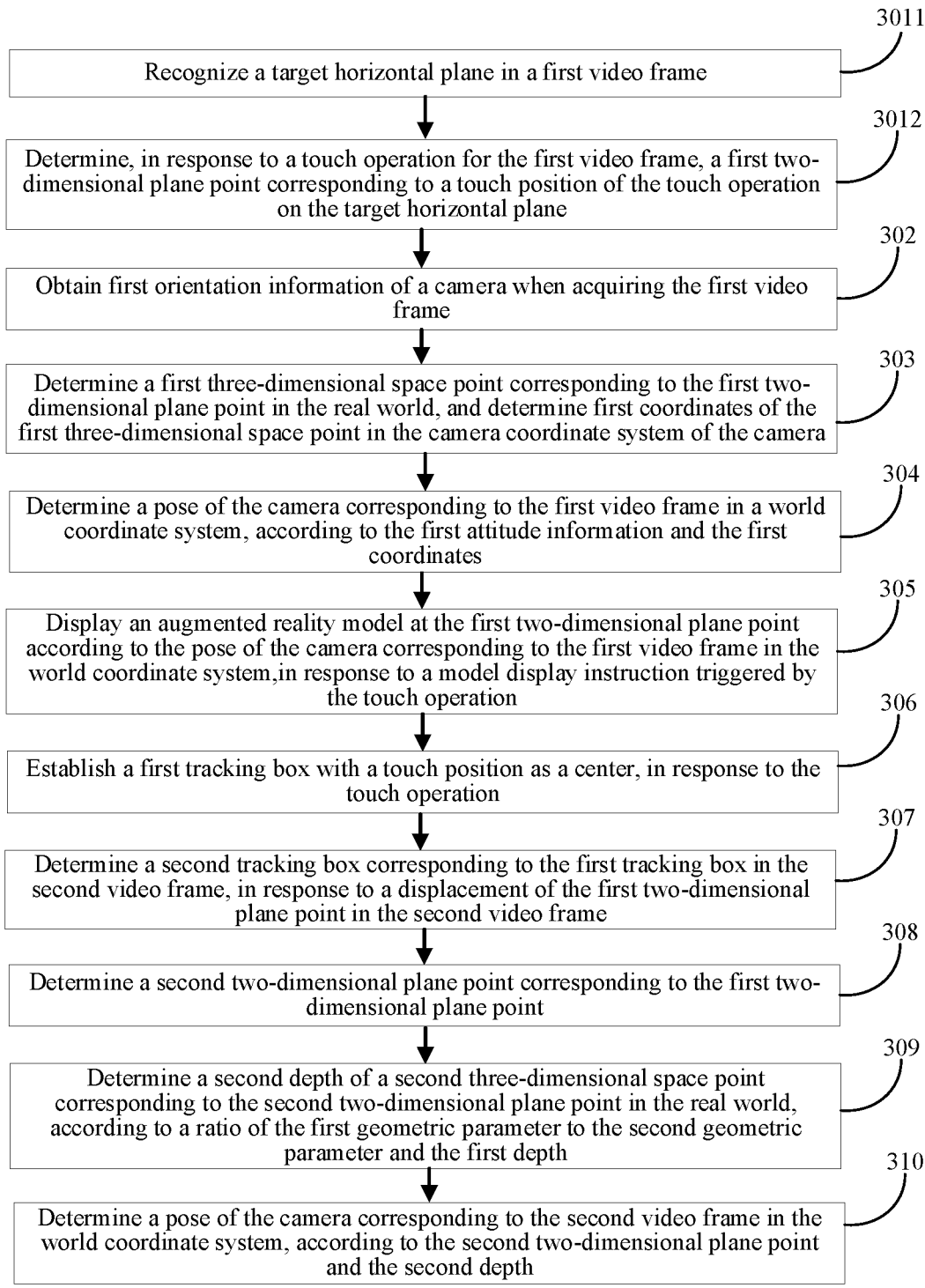
FIG. 4 is a schematic diagram of an implementation process of determining a first two-dimensional plane point according to an embodiment of this application.

As an example, as shown in FIG. 4, an implementation process of step 301 includes the following step 3011 and step 3012:

Step 3011. Recognize the target horizontal plane in the first video frame.

As an example, the AR client determines the target horizontal plane in the first video frame using the Gracker algorithm. Alternatively, the AR client can determine the target horizontal plane in the first video frame using the planar image tracking function in the EasyAR. The AR client can recognize the target horizontal plane in the first video frame when displaying the first video frame. For example, a desktop, a ground, etc. are recognized in the first video frame.

Step 3012. Determine, in response to a touch operation for the first video frame, the first two-dimensional plane point corresponding to a touch position of the touch operation on the target horizontal plane.

Optionally, the touch operation includes a single-click operation, a double-click operation, a slide operation, a long press operation, etc. Exemplarily, in a case that a user touches a display screen of the electronic device, currents are formed on a surface of the display screen, and flow out of four electrodes on four corners of the display screen. The magnitudes of the currents flowing through the four electrodes are proportional to distances from the user's finger to the four corners. According to a proportion of the magnitudes of the currents flowing through the four electrodes, the electronic device can determine a position of the touch operation in the first video frame, namely a position of the first two-dimensional plane point. In a case that at least two horizontal planes have been recognized in the first video frame, the AR client determines the horizontal plane corresponding to the touch operation as the target horizontal plane according to the touch operation. The first two-dimensional plane point is used for displaying an AR model in the first video frame.

In some embodiments, the touch operation is the single-click operation. The AR client determines a click position of the single-click operation on the target horizontal plane as the first two-dimensional plane point, in response to the single-click operation for the target horizontal plane. The click position refers to a position of a pixel point where the user clicks on the target horizontal plane in the first video frame.

Step 302. Obtain first orientation information of a camera when acquiring the first video frame.

As an example, the first orientation information is used for reflecting a change in a current attitude of the camera relative to an attitude when horizontally northward. The attitude of the camera refers to an attitude of the electronic device. An IMU is integrated in the electronic device installed with the AR client. The AR client obtains, via the IMU, orientation information of the IMU in a case that the camera acquires the first video frame, and determines the first orientation information according to the orientation information of the IMU and a rotation attitude of the camera coordinate system relative to an IMU coordinate system. The IMU coordinate system is a coordinate system calibrated when the IMU is produced.

Exemplarily, the first orientation information of the camera when acquiring the first video frame is: $R_0 = R_{ic}^{-1} * R_{imu,0} * R_{ic}$. Where, $R_{imu,0}$ is the orientation information of the IMU in a case that the camera acquires the first video frame. $R_{ic}$ is a known quantity, which is the rotation attitude of the camera coordinate system relative to the IMU coordinate system.

Step 303. Determine a first three-dimensional space point corresponding to the first two-dimensional plane point in the real world, and determine first coordinates of the first three-dimensional space point in the camera coordinate system of the camera.

In the process of image acquisition, the camera converts information acquired in the real world into information in the two-dimensional plane, so as to achieve the image acquisition. The first three-dimensional space point is a corresponding point of the first two-dimensional plane point in the real world. The first coordinates of the first three-dimensional space point in the first video frame in the camera coordinate system of the camera are used for determining the position in the pose of the camera in the world coordinate system.

Figure 5:
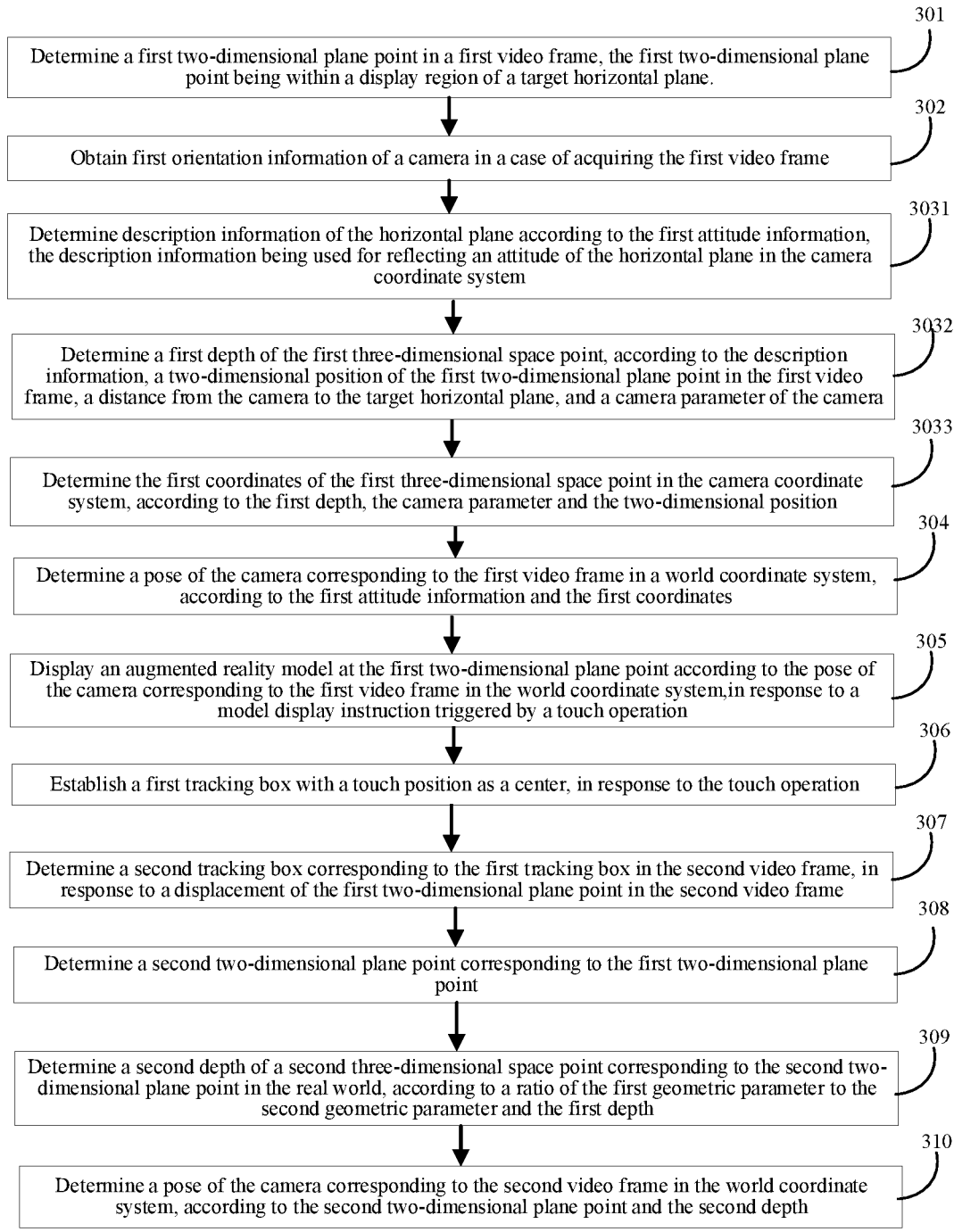
FIG. 5 is a schematic diagram of an implementation process of determining first coordinates of a first two-dimensional plane point according to an embodiment of this application.

In some embodiments, as shown in FIG. 5, an implementation process of step 303 includes the following step 3031 to step 3033:

Step 3031. Determine description information of the horizontal plane according to the first orientation information, the description information being used for reflecting an orientation of the horizontal plane in the camera coordinate system.

This horizontal plane is one that corresponds to the target horizontal plane in the real world. The first orientation information can reflect the change in the current attitude of the camera relative to the attitude when horizontally northward. Thus, the orientation information of the camera when it is horizontal, namely the description information of the horizontal plane, can be determined according to the first orientation information.

Exemplarily, the first orientation information of the camera is $R_0$, and the description information of the horizontal plane is a normal vector of the horizontal plane, which is $n = R_0^{-1} * (0, 0, -1)^T$.

Step 3032. Determine a first depth of the first three-dimensional space point, according to the description information, a two-dimensional position of the first two-dimensional plane point in the first video frame, a distance from the camera to the target horizontal plane, and a camera parameter of the camera.

As an example, the distance from the camera to the target horizontal plane is usually set to 1 m. The AR client may determine the distance from the camera to the target horizontal plane via an infrared range finder on the electronic device. Alternatively, the AR client determines the distance from the camera to the target horizontal plane through a monocular ranging algorithm. The first depth of the first three-dimensional space point is used for reflecting the distance between the first three-dimensional space point in the camera coordinate system and the origin of the camera coordinate system. The camera intrinsic parameter (also referred to as a camera intrinsic matrix) is used for realizing coordinate conversion between the camera coordinate system and the image plane coordinate system.

Exemplarily, the description information of the target horizontal plane is n; the two-dimensional position of the first two-dimensional plane point is $p_0=(u, v)$, representing the coordinates of the first two-dimensional plane point in the image coordinate system corresponding to the first video frame; the distance from the camera to the target horizontal plane is d; and the camera intrinsic parameter of the camera is K. To facilitate calculation, the two-dimensional position of the first two-dimensional plane point is converted to a homogeneous coordinate form $p'_0=(u, v, 1)$, then the first depth of the first three-dimensional space point is:

$$s_0 = \frac{d}{(-n^T(K^{-1}p'_0))}.$$

Where the camera intrinsic parameter of the camera is:

$$K = \begin{bmatrix} f & 0 & u_0 \\ 0 & f & v_0 \\ 0 & 0 & 1 \end{bmatrix}.$$

Where f is a focal length of the camera; $u_0$ represents an abscissa of an optical center of the camera in the image coordinate system corresponding to the acquired image; and $v_0$ represents an ordinate of the optical center of the camera in the image coordinate system corresponding to the acquired image. The x and y coordinates of the first two-dimensional plane point in the camera coordinate system can be obtained according to $K^{-1}p_0'$, and the coordinates of the first three-dimensional space point in the camera coordinate system can be obtained according to the x and y coordinates of the first two-dimensional plane point in the camera coordinate system.

Step 3033. Determine the first coordinates of the first three-dimensional space point in the camera coordinate system, according to the first depth, the camera parameter and the two-dimensional position.

According to the first depth, the camera intrinsic parameter and the two-dimensional position, the AR client can determine a distance and a direction of the first three-dimensional space point in the camera coordinate system relative to the origin, so as to determine the first coordinates of the first three-dimensional space point in the camera coordinate system. Exemplarily, the first coordinates of the first three-dimensional space point in the camera coordinate system are:

$$P_0=s_0(K^{-1}p_0')$$

Step 304. Determine a pose of the camera corresponding to the first video frame in the world coordinate system, according to the first orientation information and the first coordinates.

The origin of the world coordinate system is the first three-dimensional space point. The AR client determines the attitude in the pose according to the first orientation information, and determines the position in the pose according to the first orientation information and the first coordinates.

Exemplarily, $C_0$ represents the camera coordinate system, and W represents the world coordinate system. The first orientation information of the camera is $R_0$, and the first coordinates of the first three-dimensional space point are $P_0$. The pose of the camera in the world coordinate system is:

$$T_{w,c_0} = \begin{bmatrix} R_0 & -R_0P_0 \\ 0,0,0 & 1 \end{bmatrix}.$$

Where $R_0$ is a matrix with 3 rows and 3 columns, namely the first orientation information, which is used for representing the attitude in the pose of the camera. $-R_0P_0$ is a matrix with 3 rows and 1 column, which is used for representing the position in the pose of the camera. The bottom row is 0, 0, 0, 1, which is a form of a pose matrix. The last row of the pose matrix is generally 0, 0, 0, 1.

Step 305. Display an AR model at the first two-dimensional plane point according to the pose of the camera corresponding to the first video frame in the world coordinate system, in response to a model display instruction triggered by the touch operation.

As an example, the touch operation for the first video frame may trigger the model display instruction. In response to the model display instruction, the AR client can display the AR model at the first two-dimensional plane point in the first video frame according to the determined pose of the camera in the world coordinate system.

As an example, the first two-dimensional plane point is used as a reference point, and a center of the displayed AR model is located at the reference point.

Figure 6:
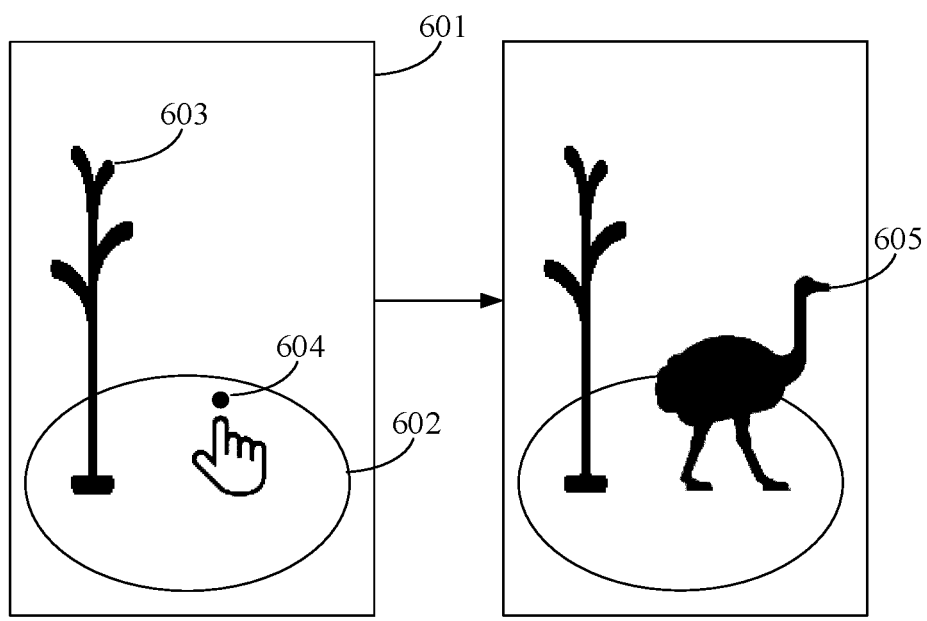
FIG. 6 is a schematic diagram of displaying an augmented reality (AR) model according to an embodiment of this application.

Exemplarily, FIG. 6 is a schematic diagram of displaying an AR model according to an embodiment of this application. As shown in FIG. 6, a first video frame 601 acquired by the camera includes a target plane 602 recognized by the AR client. The target plane 602 is the ground. The first video frame also includes a clothes hanger placed on the target plane 602. In the target plane 602, the AR client determines a first two-dimensional plane point 604 according to a touch operation. As shown in FIG. 6, the AR client displays an AR model 605 at the first two-dimensional plane point 604, according to the pose of the camera in the world coordinate system that is determined based on the first two-dimensional plane point 604. The AR model 605 is an ostrich model.

Step 306. Establish a first tracking box with a touch position as a center, in response to the touch operation.

A geometric parameter of the first tracking box is a first geometric parameter. The AR client may establish the first tracking box according to the touch operation for the first video frame. A center of the first tracking box is the touch position of the touch operation. The geometric parameter of the first tracking box is set by the AR client. For example, the geometric parameter of the first tracking box is one quarter of a narrow geometric parameter of the first video frame. The first tracking box may be a rectangle or a circular box.

In a case that the first tracking box is the rectangle, the geometric parameter is a side length of the rectangle. In a case that the first tracking box is the circular box, the geometric parameter is a radius of the circular box.

Step 307. Determine a second tracking box corresponding to the first tracking box in the second video frame, in response to a displacement of the first two-dimensional plane point in the second video frame.

Figure 14A:
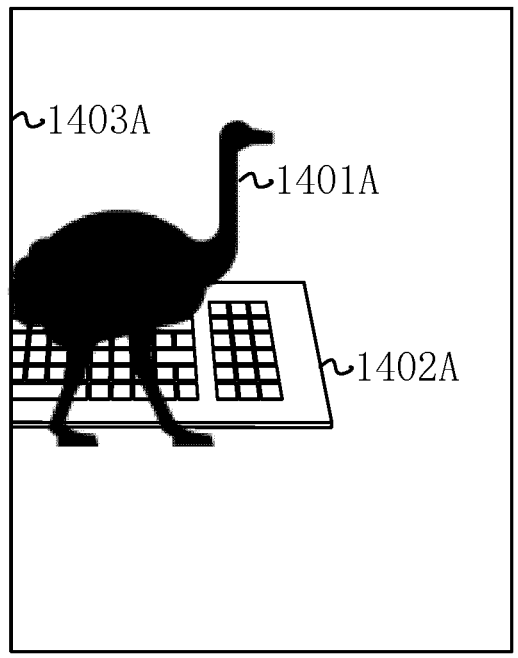
FIG. 14A and FIG. 14B are schematic diagrams of AR interaction according to an embodiment of this application.
Figure 14B:
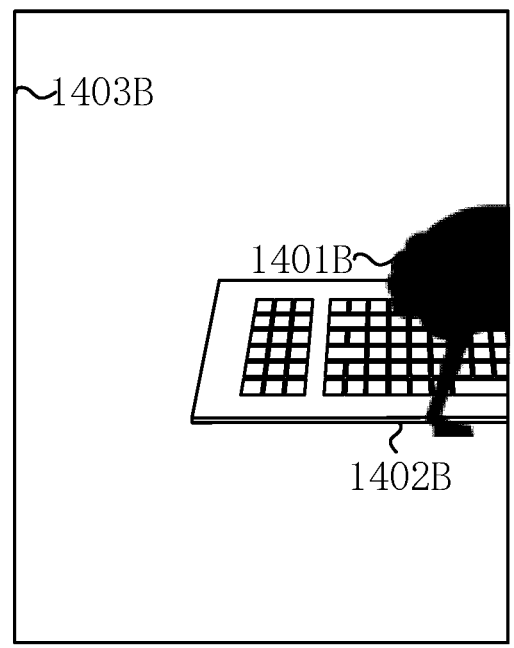

As an example, there is a displacement in step 307 when a lens moves during a shooting process. Referring to FIG. 14A and FIG. 14B, which are schematic diagrams of AR interaction according to an embodiment of this application, in response to the displacement of the first two-dimensional plane point in the second video frame, a keyboard 1402A captured in real time and an AR model 1401A are presented in a first video frame 1403A in FIG. 14A, and a keyboard 1402B captured in real time and an AR model 1401B are presented in a second video frame 1403B in FIG. 14B. The first two-dimensional plane point is a central position of the AR model 1401A. The first two-dimensional plane point of the first video frame has the displacement in the second video frame, and moves to a central position of the AR model 1401B, namely the second two-dimensional plane point of the second video frame.

Figure 15A:
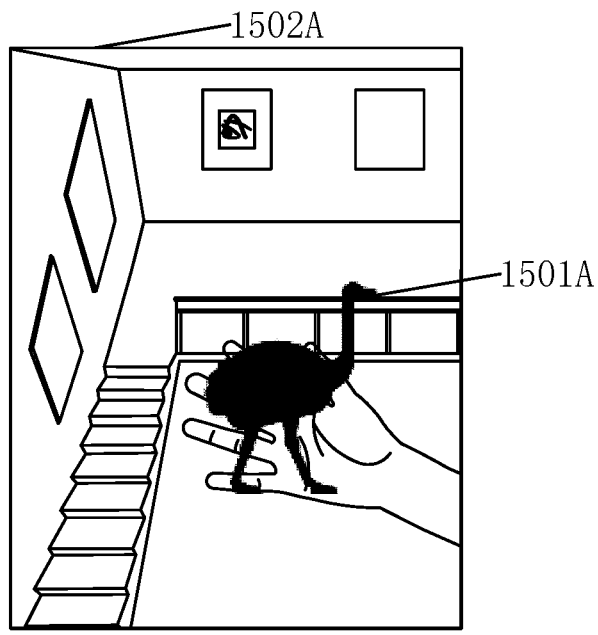
FIG. 15A and FIG. 15B are schematic diagrams of AR interaction according to an embodiment of this application.
Figure 15B:
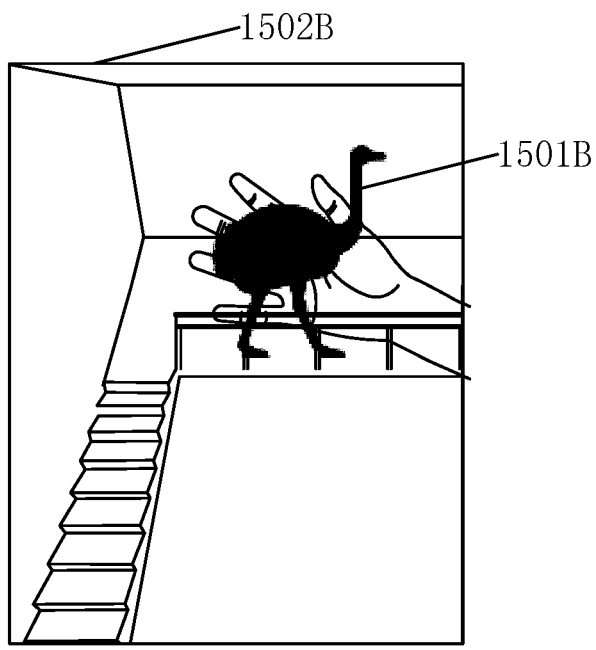

As an example, a user may drag the AR model during the shooting process, and there is a displacement in step 307 during the dragging process. Referring to FIG. 15A and FIG. 15B, which are schematic diagrams of AR interaction according to an embodiment of this application, in response to the displacement of the first two-dimensional plane point in the second video frame, an AR model 1501A is presented in a first video frame 1502A in FIG. 15A, and an AR model 1501B is presented in a second video frame 1502B in FIG. 15B. The first two-dimensional plane point is a central position of the AR model 1501A. The first two-dimensional plane point of the first video frame has the displacement in the second video frame, and moves to a central position of the AR model 1501B, namely the second two-dimensional plane point of the second video frame, thereby realizing the above human-computer interaction process. The geometric parameter of the second tracking box is a second geometric parameter. The second video frame is a subsequent video frame of the first video frame. In a case that there is a displacement of the camera that acquires the first video frame, the first two-dimensional plane point has a displacement in the second video frame. According to the first tracking box established in step 306, the AR client can track the region content corresponding to the first tracking box in the first video frame, so as to determine the second tracking box corresponding to the first tracking box in the second video frame.

As an example, in a case that the second tracking box is a rectangle, the geometric parameter is a side length of the rectangle; and in a case that the second tracking box is a circular box, the geometric parameter is a radius of the circular box.

Figure 7:
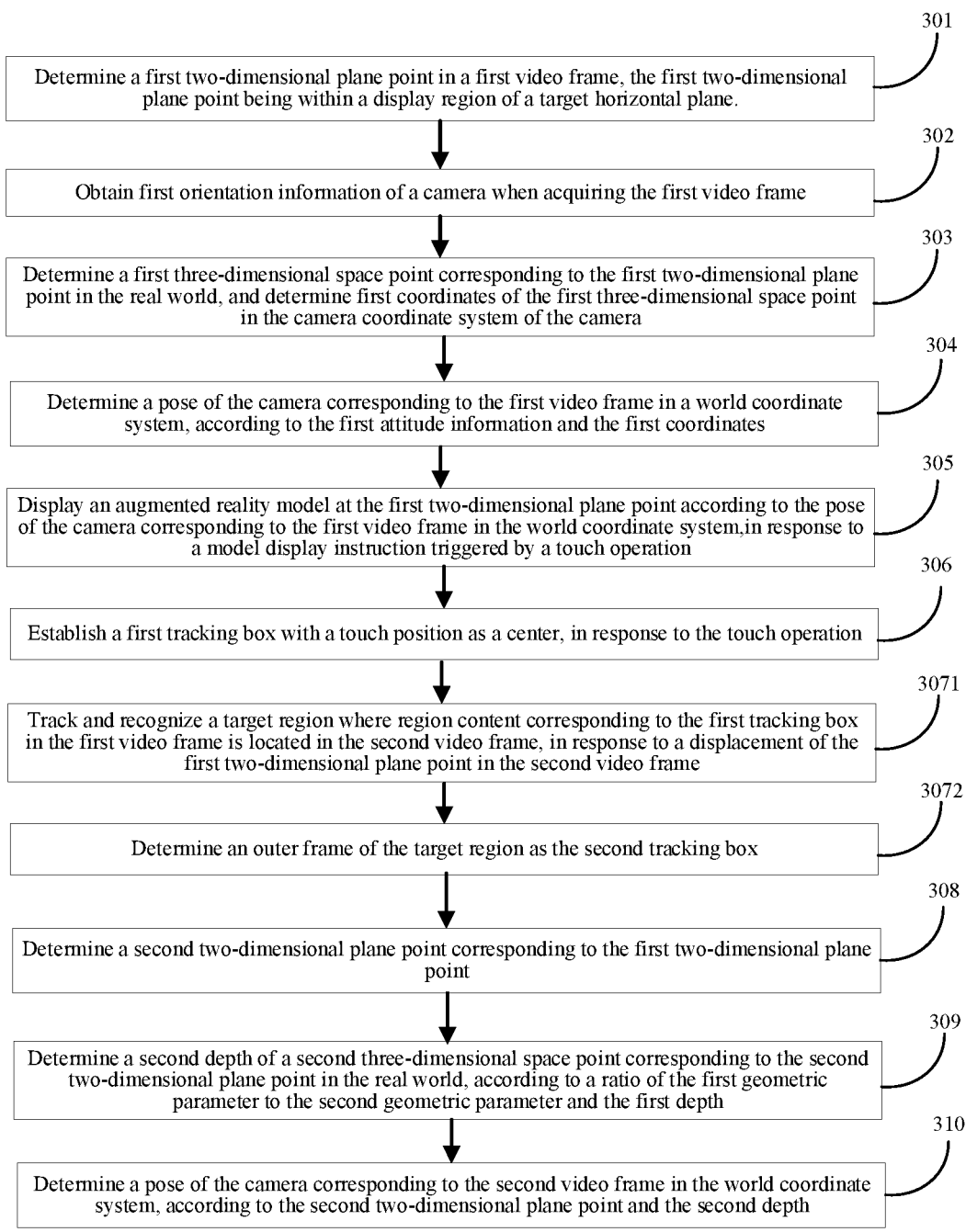
FIG. 7 is a schematic diagram of an implementation process of determining a second two-dimensional plane point according to an embodiment of this application.

In some embodiments, as shown in FIG. 7, an implementation process of step 307 includes the following step 3071 and step 3072:

Step 3071. Track and recognize a target region where region content corresponding to the first tracking box in the first video frame is located in the second video frame, in response to the displacement of the first two-dimensional plane point in the second video frame.

As an example, the AR client uses an optical flow approach to detect, in the second video frame, the region content corresponding to the first tracking box in the first video frame, so as to determine the target region where the region content is located in the second video frame. For example, in the first video frame, the region content corresponding to the first tracking box includes paper scraps on the ground. Accordingly, in the second video frame, the AR client uses the optical flow approach to track, in the second video frame, the region content corresponding to the first tracking box in the first video frame, namely tracking, in the second video frame, the paper scraps on the ground in the first video frame, so as to determine the target region where the region content is located in the second video frame. The client may use a kernel correlation filter (KCF) algorithm and a tracking-learning detection (TLD) algorithm to track the target region where the region content corresponding to the first tracking box in the first video frame is located in the second video frame. Optionally, in a case that there is a zoom operation on the region content in the first tracking box displayed by the AR client, that is, the camera moves, or a user performs the zoom operation, the AR client tracks the first tracking box, and synchronously performs the zoom operation on the first tracking box in the second video frame to obtain the second tracking box.

Step 3072. Determine an outer frame of the target region as the second tracking box.

Step 308. Determine a second two-dimensional plane point corresponding to the first two-dimensional plane point.

In some embodiments, the AR client determines a center of the second tracking box as the second two-dimensional plane point. The second two-dimensional plane point is used for the AR client to continue displaying the AR model in the second video frame.

Step 309. Determine a second depth of a second three-dimensional space point corresponding to the second two-dimensional plane point in the real world, according to a ratio of the first geometric parameter to the second geometric parameter and the first depth.

The second depth is used for reflecting a distance between the second three-dimensional space point in the camera coordinate system and the origin of the camera coordinate system. Exemplarily, the second depth of the second three-dimensional space point is:

$$s_2 = \frac{s_0 w_0}{w_2}.$$

Where $s_0$ is the first depth of the first three-dimensional space point, $w_0$ is the first geometric parameter of the first tracking box, and $w_2$ is the second geometric parameter of the second tracking box.

Step 310. Determine a pose of the camera corresponding to the second video frame in the world coordinate system, according to the second two-dimensional plane point and the second depth.

According to the determined second two-dimensional plane point, the AR client performs the pose determining steps again, namely determining the pose of the camera corresponding to the second video frame in the world coordinate system, so as to determine the pose of the camera in the world coordinate system in a case that the camera acquires the second video frame. The AR model is displayed at the second two-dimensional plane point, according to the pose of the camera corresponding to the second video frame in the world coordinate system. The second two-dimensional plane point is used as a reference point, and the center of the displayed AR model is located at the reference point. As such, the AR client can continue displaying the AR model in the first video frame at the second two-dimensional plane point in the second video frame. In addition, when the AR client determines the pose when acquiring a video frame after the second video frame, the video frame that needs to undergo the pose determining is taken as the second video frame, and the previous video frame of the video frame that needs to undergo the pose determining is taken as the first video frame. Through the above method, the AR client can continue to determine the pose of the camera in a case that the camera acquires the video frame after the second video frame, and display the AR model according to the pose.

Exemplarily, second coordinates of the second three-dimensional space point in the camera coordinate system are:

$P_2 = s_2 (K^{-1} p_2')$, where $p_2'$ is a homogeneous coordinate form of the second two-dimensional plane point.

$C_2$ represents the camera coordinate system in a case that the camera acquires the second video frame, and W represents the world coordinate system. The second orientation information of the camera is $R_2$ which is obtained by the AR client using the IMU in a case that the camera acquires the second video frame. The pose of the camera in the world coordinate system is:

$$T_{w,c_2} = \begin{bmatrix} R_2 & -R_2 P_2 \\ 0,0,0 & 1 \end{bmatrix}.$$

In summary, according to the first orientation information of the camera when acquiring the first video frame and the first coordinates of the first three-dimensional space point in the camera coordinate system, the first three-dimensional space point corresponding to the first two-dimensional plane point in the first video frame in the real world, the pose determining method provided by this embodiment of this application can determine the pose of the camera in the world coordinate system, so as to display the AR model in the first video frame according to the pose. By the first tracking box, the second two-dimensional plane point corresponding to the first two-dimensional plane point is determined in the second video frame subsequent to the first video frame, and the second depth of the second three-dimensional space point corresponding to the second two-dimensional plane point in the real world is determined. The pose of the camera in the world coordinate system can also be determined, according to the second two-dimensional plane point and the second depth. During the process of determining the pose, there is no need to move the electronic device for system initialization, which simplifies the process of determining the pose, thereby improving the timeliness of determining the pose.

In addition, when determining the pose of the camera through the VIO technology, the VIO technology needs to calculate the position in the pose using an integral of an accelerometer, which relies on a high-precision IMU. By using the pose determining method provided by this embodiment of this application, there is no requirement for an IMU with high precision, which expands a range of compatible electronic device, thereby covering more electronic devices. In a case of determining the pose of the camera through the VIO technology, it is necessary to reconstruct pixel points in a video frame, which has high performance requirements for the electronic device. In a case of using the pose determining method provided by this embodiment of this application, the computing resource is mainly consumed in tracking the tracking box in the video frame, which can reduce consumption of the computing resource. The pose determining method provided by this embodiment of this application is based on the target plane, therefore a user's hand may be used as the target plane, that is, the displayed AR model can follow the user's hand to move, which provides an interesting interaction mode. The second two-dimensional plane point is determined by the tracking box, so that the AR model can be automatically displayed in the second video frame, thereby improving the user experience.

The sequence of the method steps according to the embodiments of this application may be adjusted appropriately, and the steps may be increased or decreased according to situations. Methods that can be easily made within the technical scope disclosed in this application by any person skilled in the art are within the protection scope of this application, which is not detailed herein.

Figure 8:
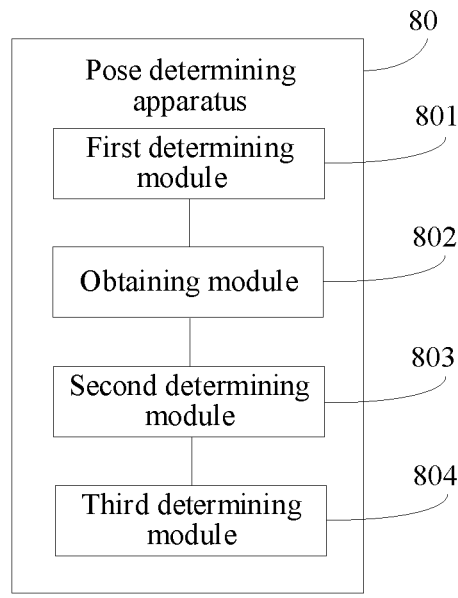
FIG. 8 is a block diagram of a pose determining apparatus according to an embodiment of this application.

FIG. 8 is a block diagram of a pose determining apparatus according to an embodiment of this application. The apparatus may be applied to an electronic device or an AR client on an electronic device. As shown in FIG. 8, the apparatus 80 includes: a first determining module 801, configured to determine a first two-dimensional plane point in a first video frame, the first two-dimensional plane point being within a display region of a target horizontal plane, and the target horizontal plane being imaging content of a horizontal plane in a real world in the first video frame; an obtaining module 802, configured to obtain first orientation information of a camera when acquiring the first video frame; a second determining module 803, configured to determine a first three-dimensional space point corresponding to the first two-dimensional plane point in the real world, and determine first coordinates of the first three-dimensional space point in a camera coordinate system, the first three-dimensional space point being an origin of a world coordinate system; and a third determining module 804, configured to determine a pose of the camera corresponding to the first video frame in the world coordinate system, according to the first orientation information and the first coordinates.

In some embodiments, the third determining module 804 is configured to multiply the first orientation information and the first coordinates, and calculate a negative of a multiplication result, to obtain a negative processing result; and construct a matrix used for characterizing the pose of the camera corresponding to the first video frame in the world coordinate system, based on the negative processing result and the first orientation information.

Figure 9:
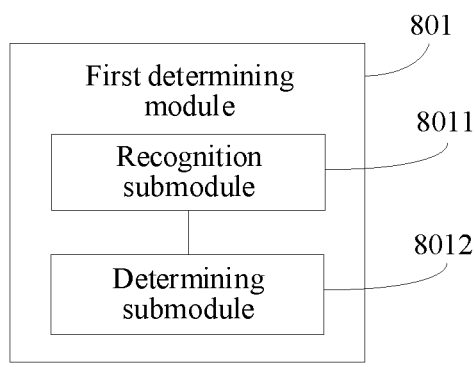
FIG. 9 is a block diagram of a first determining module according to an embodiment of this application.

In some embodiments, as shown in FIG. 9, the first determining module 801 includes: a recognition submodule 8011, configured to recognize the target horizontal plane in the first video frame; and a determining submodule 8012, configured to determine, in response to a touch operation for the first video frame, the first two-dimensional plane point corresponding to a touch position of the touch operation on the target horizontal plane.

In some embodiments, the recognition submodule 8011 is configured to determine the target horizontal plane in the first video frame using the Gracker algorithm.

In some embodiments, the determining submodule 8012 is configured to determine, in response to a single-click operation for the target horizontal plane, a click position of the single-click operation on the target horizontal plane as the first two-dimensional plane point.

In some embodiments, the obtaining module 802 is configured to obtain, via an IMU, the first orientation information of the camera when acquiring the first video frame.

In some embodiments, the second determining module 803 is configured to determine description information of the horizontal plane according to the first orientation information, the description information being used for reflecting an orientation of the horizontal plane in the camera coordinate system; determine a first depth of the first three-dimensional space point, according to the description information, a two-dimensional position of the first two-dimensional plane point in the first video frame, a distance from the camera to the target horizontal plane and a camera parameter, the first depth being used for reflecting a distance between the first three-dimensional space point in the camera coordinate system and an origin of the camera coordinate system; and determine the first coordinates of the first three-dimensional space point in the camera coordinate system, according to the first depth, the camera parameter, and the two-dimensional position.

Figure 10:
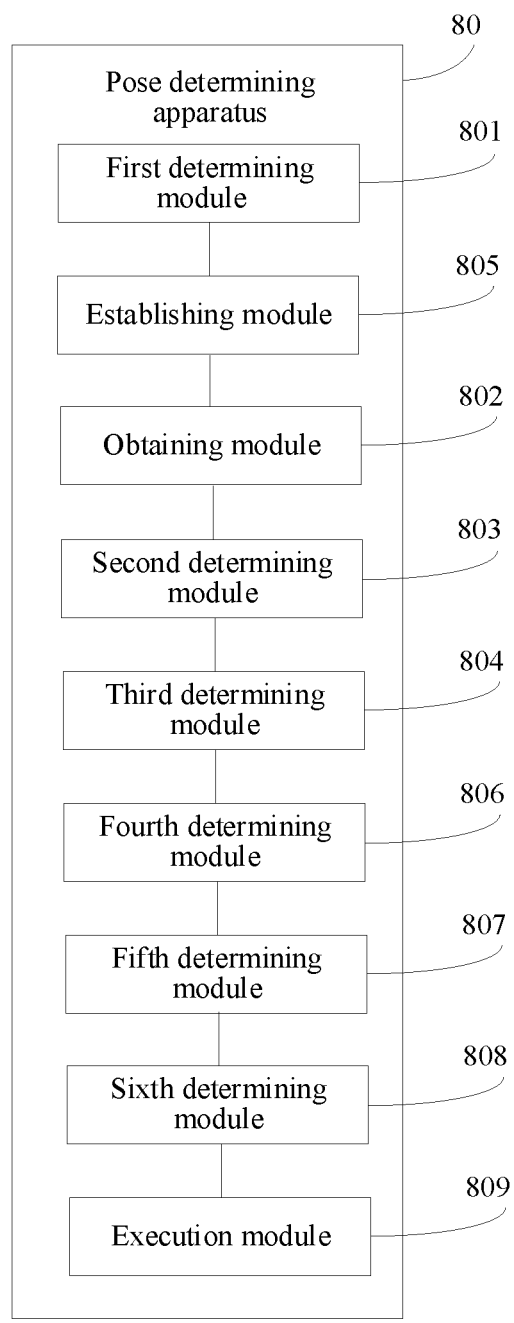
FIG. 10 is a block diagram of another pose determining apparatus according to an embodiment of this application.

In some embodiments, as shown in FIG. 10, the apparatus 80 further includes: an establishing module 805, configured to establish, in response to the touch operation, a first tracking box with the touch position as a center, a geometric parameter of the first tracking box being a first geometric parameter; a fourth determining module 806, configured to determine a second tracking box corresponding to the first tracking box in the second video frame, in response to a displacement of the first two-dimensional plane point in the second video frame, a geometric parameter of the second tracking box being a second geometric parameter, and the second video frame being a subsequent video frame of the first video frame; a fifth determining module 807, configured to determine a second two-dimensional plane point corresponding to the first two-dimensional plane point; a sixth determining module 808, configured to determine a second depth of a second three-dimensional space point corresponding to the second two-dimensional plane point in the real world, according to a ratio of the first geometric parameter to the second geometric parameter and the first depth, the second depth being used for reflecting a distance between the second three-dimensional space point in the camera coordinate system and the origin of the camera coordinate system; and an execution module 809, configured to determine a pose of the camera corresponding to the second video frame in the world coordinate system, according to the second two-dimensional plane point and the second depth.

Figure 11:
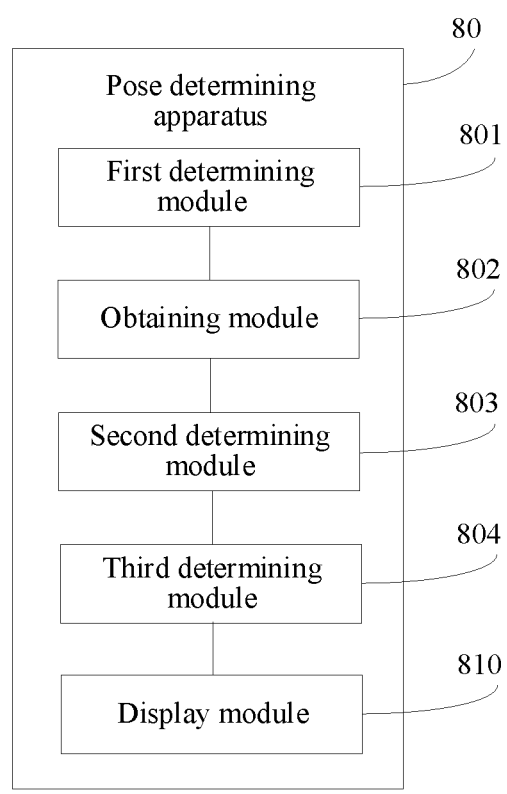
FIG. 11 is a block diagram of still another pose determining apparatus according to an embodiment of this application.

In some embodiments, as shown in FIG. 11, the apparatus 80 further includes: a display module 810, configured to display an AR model at the second two-dimensional plane point according to the pose of the camera corresponding to the second video frame in the world coordinate system, in response to a model display instruction triggered by the touch operation.

In some embodiments, the fourth determining module 806 is configured to track and recognize a target region where region content corresponding to the first tracking box in the first video frame is located in the second video frame, in response to the displacement of the first two-dimensional plane point in the second video frame; and determine an outer frame of the target region as the second tracking box.

In some embodiments, the fifth determining module 807 is configured to determine a center of the second tracking box as the second two-dimensional plane point.

In some embodiments, the third determining module 804 is configured to determine an attitude in the pose according to the first orientation information; and determine a position in the pose according to the first orientation information and the first coordinates.

In some embodiments, as shown in FIG. 11, the apparatus 80 further includes: a display module 810, configured to display an AR model at the first two-dimensional plane point according to the pose of the camera corresponding to the first video frame in the world coordinate system, in response to a model display instruction triggered by the touch operation.

The pose determining apparatus provided in the foregoing embodiments is illustrated with an example of division of the foregoing functional modules. In actual application, the functions may be allocated to and completed by different functional modules according to requirements, that is, the internal structure of the electronic device is divided into different functional modules, to implement all or some of the functions described above. In addition, the position and pose determining apparatus and position and pose determining method embodiments in the foregoing embodiments are designed with a same idea, and a specific implementation thereof is shown in the method embodiments, and the details thereof are not described herein again.

The embodiments of this application further provide an electronic device. The electronic device includes processor and a memory. The memory stores at least one instruction, at least one program, a code set, or an instruction set. The at least one instruction, the at least one program, the code set, or the instruction set is loaded and executed by the processor to implement the pose determining method according to the foregoing method embodiments.

Figure 12:
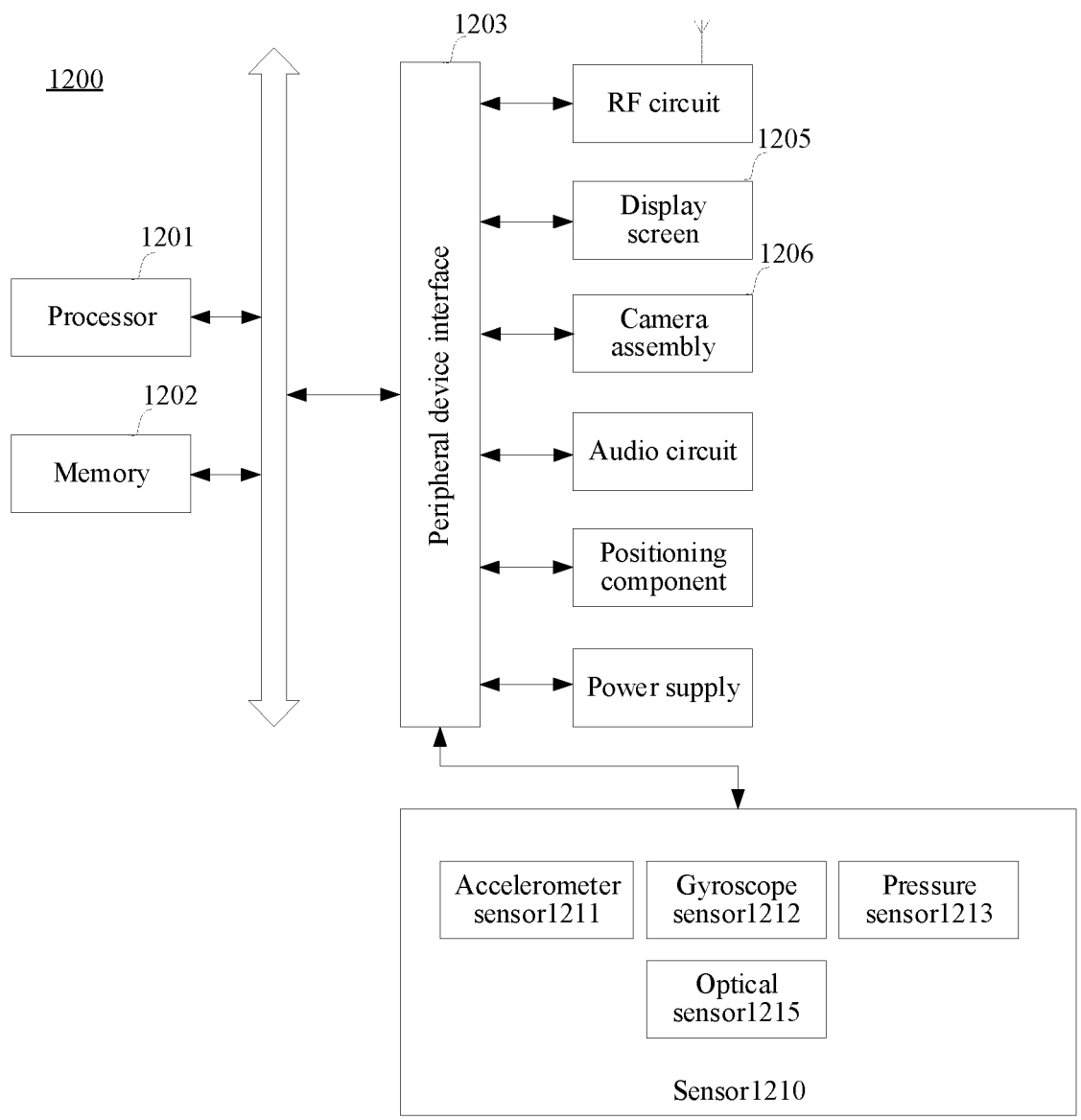
FIG. 12 is a schematic structural diagram of a terminal according to an embodiment of this application.

In some embodiments, the electronic device is installed with an AR client, and the electronic device is a terminal. Exemplarily, FIG. 12 is a schematic structural diagram of a terminal according to an embodiment of this application.

Generally, the terminal 1200 includes a processor 1201 and a memory 1202.

The processor 1201 may include one or more processing cores, for example, a 4-core processor or a 12-core processor. The processor 1201 may be implemented by using at least one hardware form of a digital signal processor (DSP), a field-programmable gate array (FPGA), and a programmable logic array (PLA).

The processor 1201 may also include a main processor and a co-processor. The main processor is a processor for processing data in a wake-up state, also referred to as a central processing unit (CPU). The coprocessor is a low-power processor configured to process data in a standby state. In some embodiments, the processor 1201 may be integrated with a graphics processing unit (GPU) that is responsible for rendering and drawing content needing to be displayed by a display screen. In some embodiments, the processor 1201 may further include an artificial intelligence (AI) processor. The AI processor is configured to process computing operations related to machine learning.

The memory 1202 may include one or more computer-readable storage media that may be non-transitory. The memory 1202 may further include a high-speed random access memory and a non-volatile memory, such as one or more magnetic disk storage devices or flash storage devices. In some embodiments, a non-transitory computer-readable storage medium in the memory 1202 is configured to store at least one instruction, the at least one instruction being configured to be executed by the processor 1201 to implement the pose determining method provided in the method embodiments of this application.

In some embodiments, the terminal 1200 may optionally include a peripheral interface 1203 and at least one peripheral. The processor 1201, the memory 1202, and the peripheral interface 1203 may be connected by a bus or a signal line. Each peripheral may be connected to the peripheral interface 1203 by using a bus, a signal cable, or a circuit board. Specifically, the peripheral device include: at least one of a display screen 1205 and a camera assembly 1206.

The peripheral interface 1203 may be configured to connect the at least one peripheral related to input/output (I/O) to the processor 1201 and the memory 1202. In some embodiments, the processor 1201, the memory 1202 and the peripheral interface 1203 are integrated on the same chip or circuit board. In some other embodiments, any one or two of the processor 1201, the memory 1202, or the peripheral interface 1203 may be implemented on an independent chip or circuit board. This is not limited in this embodiment of this application.

The display screen 1205 is configured to display a UI. The UI may include a graph, a text, an icon, a video, and any combination thereof. When the display screen 1205 is the touch display screen, the display screen 1205 also has the capability to collect a touch signal on or above a surface of the display screen 1205. The touch signal may be inputted into the processor 1201 as a control signal for processing. In this case, the display screen 1205 may be further configured to provide a virtual button and/or a virtual keyboard, also referred to as a soft button and/or a soft keyboard. In some embodiments, there may be one display screen 1205 arranged on a front panel of the terminal 1200. In some other embodiments, there may be two display screens 1205 respectively arranged on different surfaces of the terminal 1200 or in a folded design. In still other embodiments, the display screen 1205 may be a flexible display screen disposed on a curved surface or a folded surface of the terminal 1200. Even, the display screen 1205 may be further set to have a non-rectangular irregular graph, that is, a special-shaped screen. The display screen 1205 may be manufactured by using a material such as a liquid crystal display (LCD), an organic light-emitting diode (OLED), or the like.

The camera component 1206 is configured to capture an image or a video. Optionally, the camera assembly 1206 includes a front-facing camera and a rear-facing camera. Generally, the front-facing camera is disposed on the front panel of the terminal 1200, and the rear-facing camera is disposed on a back surface of the terminal. In some embodiments, there are at least two rear-facing cameras, which are respectively any of a main camera, a depth-of-field camera, a wide-angle camera, and a telephoto camera, to achieve background blurring function through fusion of the main camera and the depth-of-field camera, panoramic photographing and virtual reality (VR) photographing through fusion of the main camera and the wide-angle camera, or other fusion photographing functions. In some embodiments, the camera assembly 1206 may also include a flashlight. The flash may be a monochrome temperature flash, or may be a double color temperature flash. The double color temperature flash refers to a combination of a warm light flash and a cold light flash, and may be used for light compensation under different color temperatures.

In some embodiments, the terminal 1200 may further include one or more sensors 1210. The one or more sensors 1210 include, but are not limited to: an acceleration sensor 1211, a gyroscope sensor 1212, a pressure sensor 1213, and an optical sensor 1215.

The acceleration sensor 1211 may detect a magnitude of acceleration on three coordinate axes of a coordinate system established with the terminal 1200. For example, the acceleration sensor 1211 may be configured to detect a component of gravity acceleration on the three coordinate axes. The processor 1201 may control, according to a gravity acceleration signal collected by the acceleration sensor 1211, the touch display screen 1205 to display the UI in a frame view or a portrait view. The acceleration sensor 1211 may be further configured to collect motion data of a game or a user.

The gyroscope sensor 1212 may detect a body direction and a rotation angle of the terminal 1200, and may work with the acceleration sensor 1211 to acquire a 3D action performed by the user on the terminal 1200. implement the following functions according to data collected by the gyroscope sensor 1212: motion sensing (for example, the UI is changed according to a tilt operation of the user), image stabilization during shooting, game control, and inertial navigation.

The pressure sensor 1213 may be disposed on a side frame of the terminal 1200 and/or a lower layer of the touch display screen 1205. When the pressure sensor 1213 is disposed at the side frame of the terminal 1200, a holding signal of the user on the terminal 1200 may be detected, and the processor 1201 performs left/right hand identification or a quick operation according to the holding signal collected by the pressure sensor 1213. When the pressure sensor 1213 is disposed on the low layer of the touch display screen 1205, the processor 1201 controls, according to a pressure operation of the user on the touch display screen 1205, an operable control on the UI. The operable control includes at least one of a button control, a scroll-bar control, an icon control, and a menu control.

The optical sensor 1215 is configured to collect ambient light intensity. In an embodiment, the processor 1201 may control display luminance of the touch display screen 1205 according to the ambient light intensity collected by the optical sensor 1215. Specifically, in a case that the ambient light intensity is relatively high, the display brightness of the touch display 1205 is increased. In a case that the ambient light intensity is relatively low, the display brightness of the touch display 1205 is reduced. In another embodiment, the processor 1201 may further dynamically adjust a shooting parameter of the camera component 1206 according to the ambient light intensity collected by the optical sensor 1215.

A person skilled in the art may understand that the structure shown in FIG. 12 does not constitute a limitation to the terminal 1200, and the terminal may include more or fewer components than those shown in the figure, or some components may be combined, or a different component deployment may be used.

The embodiments of this application further provide a computer-readable storage medium, storing at least one instruction, at least one program, a code set or an instruction set, the at least one instruction, the at least one program, the code set or the instruction set being loaded and executed by a processor of an electronic device to implement the pose determining method according to the foregoing method embodiments.

This application further provides a computer program product or a computer program is provided, the computer program product or the computer program including computer instructions, the computer instructions being stored in a computer-readable storage medium. A processor of an electronic device reads the computer instruction from the computer-readable storage medium, and the processor executes the computer instruction, to cause the electronic device to perform the pose determining method according to any of the foregoing method embodiments.

A person of ordinary skill in the art may understand that all or some of the steps of the foregoing embodiments may be implemented by hardware, or may be implemented by a program instructing relevant hardware. The program may be stored in a computer-readable storage medium. The storage medium may be a read-only memory, a magnetic disk, an optical disc, or the like.

The foregoing descriptions are merely optional embodiments of this application, but are not intended to limit this application. Any modification, equivalent replacement, or improvement made within the spirit and principle of this application shall fall within the protection scope of this application. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A method for determining a camera's pose information performed by an electronic device, and the method comprising:
   determining a first two-dimensional plane point in a first video frame captured by the camera, the first two-dimensional plane point being a user-selected point within a display region of a target horizontal plane, and the target horizontal plane being imaging content of a horizontal plane in a real world captured in the first video frame;
   obtaining first orientation information of the camera when acquiring the first video frame;
   determining a first three-dimensional space point corresponding to the first two-dimensional plane point in the real world;
   determining first coordinates of the first three-dimensional space point in a camera coordinate system, the first three-dimensional space point being an origin of a world coordinate system that is independent of a camera coordinate system;
   determining a pose of the camera when acquiring the first video frame in the world coordinate system, according to the first orientation information of the camera and the first coordinates of the first three-dimensional space point in the real world; and
   displaying an augmented reality model at the first two-dimensional plane point according to the pose of the camera corresponding to the first video frame in the world coordinate system.

2. The method according to claim 1, wherein the determining a first two-dimensional plane point in a first video frame captured by the camera comprises:
   identifying the target horizontal plane in the first video frame; and
   in response to a touch operation on the first video frame by a user, determining the first two-dimensional plane point corresponding to a touch position of the touch operation on the target horizontal plane.

3. The method according to claim 2, wherein the touch operation comprises a single-click operation, and the determining the first two-dimensional plane point corresponding to a touch position of the touch operation on the target horizontal plane comprises:
   in response to the single-click operation for the target horizontal plane, determining a click position of the single-click operation on the target horizontal plane as the first two-dimensional plane point.

4. The method according to claim 1, wherein the determining first coordinates of the first three-dimensional space point in a camera coordinate system comprises:
   determining description information of the horizontal plane according to the first orientation information of the camera, the description information being used for reflecting an orientation of the horizontal plane in the camera coordinate system;
   determining a first depth of the first three-dimensional space point, according to the description information, a two-dimensional position of the first two-dimensional plane point in the first video frame, a distance from the camera to the target horizontal plane and a camera parameter, the first depth being used for reflecting a distance between the first three-dimensional space point in the camera coordinate system and an origin of the camera coordinate system; and
   determining the first coordinates of the first three-dimensional space point in the camera coordinate system, according to the first depth, the camera parameter, and the two-dimensional position.

5. The method according to claim 4, further comprising:
   in response to a touch operation on the first video frame by a user, establishing a first tracking box with the user-selected point as a center, and using a geometric parameter of the first tracking box as a first geometric parameter;
   in response to a displacement of the first two-dimensional plane point in a second video frame captured by the camera, determining a second tracking box corresponding to the first tracking box in the second video frame, and using a geometric parameter of the second tracking box as a second geometric parameter, the second video frame being a subsequent video frame of the first video frame;
   determining a second two-dimensional plane point in the second video frame corresponding to the first two-dimensional plane point;
   determining a second depth of a second three-dimensional space point corresponding to the second two-dimensional plane point in the real world, according to a ratio of the first geometric parameter to the second geometric parameter and the first depth of the first three-dimensional space point, the second depth being used for reflecting a distance between the second three-dimensional space point in the camera coordinate system and the origin of the camera coordinate system; and
   determining a pose of the camera corresponding to the second video frame in the world coordinate system, according to the second two-dimensional plane point and the second depth.

6. The method according to claim 5, further comprising:
   displaying an augmented reality model at the second two-dimensional plane point, according to the pose of the camera corresponding to the second video frame in the world coordinate system.

7. The method according to claim 5, wherein the determining a second tracking box corresponding to the first tracking box in the second video frame comprises:
   tracking and recognizing a target region in the second video frame corresponding to the first tracking box in the first video frame, in response to the displacement of the first two-dimensional plane point in the second video frame; and
   determining an outer frame of the target region as the second tracking box.

8. The method according to claim 7, wherein the determining a second two-dimensional plane point in the second video frame corresponding to the first two-dimensional plane point comprises:
   determining a center of the second tracking box in the second video frame as the second two-dimensional plane point.

9. An electronic device, comprising a processor and a memory, the memory storing at least one instruction, and the at least one instruction, when loaded and executed by the processor, causing the electronic device to implement a method for determining a camera's pose information, and the method comprising:
   determining a first two-dimensional plane point in a first video frame captured by the camera, the first two-dimensional plane point being a user-selected point within a display region of a target horizontal plane, and the target horizontal plane being imaging content of a horizontal plane in a real world captured in the first video frame;

obtaining first orientation information of the camera when acquiring the first video frame;

determining a first three-dimensional space point corresponding to the first two-dimensional plane point in the real world;

determining first coordinates of the first three-dimensional space point in a camera coordinate system, the first three-dimensional space point being an origin of a world coordinate system that is independent of the camera coordinate system; determining a pose of the camera when acquiring the first video frame in the world coordinate system, according to the first orientation information of the camera and the first coordinates of the first three-dimensional space point in the real world; and displaying an augmented reality model at the first two-dimensional plane point according to the pose of the camera corresponding to the first video frame in the world coordinate system.

10. The electronic device according to claim 9, wherein the determining a first two-dimensional plane point in a first video frame captured by the camera comprises:

identifying the target horizontal plane in the first video frame; and in response to a touch operation on the first video frame by a user, determining the first two-dimensional plane point corresponding to a touch position of the touch operation on the target horizontal plane.

11. The electronic device according to claim 10, wherein the touch operation comprises a single-click operation, and the determining the first two-dimensional plane point corresponding to a touch position of the touch operation on the target horizontal plane comprises:

in response to the single-click operation for the target horizontal plane, determining a click position of the single-click operation on the target horizontal plane as the first two-dimensional plane point.

12. The electronic device according to claim 9, wherein the determining first coordinates of the first three-dimensional space point in a camera coordinate system comprises:

determining description information of the horizontal plane according to the first orientation information of the camera, the description information being used for reflecting an orientation of the horizontal plane in the camera coordinate system;

determining a first depth of the first three-dimensional space point, according to the description information, a two-dimensional position of the first two-dimensional plane point in the first video frame, a distance from the camera to the target horizontal plane and a camera parameter, the first depth being used for reflecting a distance between the first three-dimensional space point in the camera coordinate system and an origin of the camera coordinate system; and determining the first coordinates of the first three-dimensional space point in the camera coordinate system, according to the first depth, the camera parameter, and the two-dimensional position.

13. The electronic device according to claim 12, wherein the method further comprises:

in response to a touch operation on the first video frame by a user, establishing a first tracking box with the user-selected point as a center, and using a geometric parameter of the first tracking box as a first geometric parameter;

in response to a displacement of the first two-dimensional plane point in a second video frame captured by the camera, determining a second tracking box corresponding to the first tracking box in the second video frame, and using a geometric parameter of the second tracking box as a second geometric parameter, the second video frame being a subsequent video frame of the first video frame;

determining a second two-dimensional plane point in the second video frame corresponding to the first two-dimensional plane point;

determining a second depth of a second three-dimensional space point corresponding to the second two-dimensional plane point in the real world, according to a ratio of the first geometric parameter to the second geometric parameter and the first depth of the first three-dimensional space point, the second depth being used for reflecting a distance between the second three-dimensional space point in the camera coordinate system and the origin of the camera coordinate system; and determining a pose of the camera corresponding to the second video frame in the world coordinate system, according to the second two-dimensional plane point and the second depth.

14. A non-transitory computer-readable storage medium, storing at least one instruction, and the at least one instruction, when loaded and executed by a processor of an electronic device, causing the electronic device to implement a method for determining a camera's pose information, and the method comprising:

determining a first two-dimensional plane point in a first video frame captured by the camera, the first two-dimensional plane point being a user-selected point within a display region of a target horizontal plane, and the target horizontal plane being imaging content of a horizontal plane in a real world captured in the first video frame;

obtaining first orientation information of the camera when acquiring the first video frame;

determining a first three-dimensional space point corresponding to the first two-dimensional plane point in the real world;

determining first coordinates of the first three-dimensional space point in a camera coordinate system, the first three-dimensional space point being an origin of a world coordinate system that is independent of the camera coordinate system;

determining a pose of the camera when acquiring the first video frame in the world coordinate system, according to the first orientation information of the camera and the first coordinates of the first three-dimensional space point in the real world; and displaying an augmented reality model at the first two-dimensional plane point according to the pose of the camera corresponding to the first video frame in the world coordinate system.

15. The non-transitory computer-readable storage medium according to claim 14, wherein the determining a first two-dimensional plane point in a first video frame captured by the camera comprises:

identifying the target horizontal plane in the first video frame; and in response to a touch operation on the first video frame by a user, determining the first two-dimensional plane point corresponding to a touch position of the touch operation on the target horizontal plane.

16. The non-transitory computer-readable storage medium according to claim 15, wherein the touch operation comprises a single-click operation, and the determining the first two-dimensional plane point corresponding to a touch position of the touch operation on the target horizontal plane comprises:

in response to the single-click operation for the target horizontal plane, determining a click position of the single-click operation on the target horizontal plane as the first two-dimensional plane point.

17. The non-transitory computer-readable storage medium according to claim 14, wherein the determining first coordinates of the first three-dimensional space point in a camera coordinate system comprises:

determining description information of the horizontal plane according to the first orientation information of the camera, the description information being used for reflecting an orientation of the horizontal plane in the camera coordinate system;

determining a first depth of the first three-dimensional space point, according to the description information, a two-dimensional position of the first two-dimensional plane point in the first video frame, a distance from the camera to the target horizontal plane and a camera parameter, the first depth being used for reflecting a distance between the first three-dimensional space point in the camera coordinate system and an origin of the camera coordinate system; and determining the first coordinates of the first three-dimensional space point in the camera coordinate system, according to the first depth, the camera parameter, and the two-dimensional position.

* * * * *